US008670704B2

(12) United States Patent
Dayal et al.

(10) Patent No.: US 8,670,704 B2
(45) Date of Patent: Mar. 11, 2014

(54) PILOT TRANSMISSION BY RELAY STATIONS IN A MULTIHOP RELAY COMMUNICATION SYSTEM

(75) Inventors: Pranav Dayal, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 671 days.

(21) Appl. No.: 12/042,864

(22) Filed: Mar. 5, 2008

(65) Prior Publication Data

US 2008/0227386 A1 Sep. 18, 2008

Related U.S. Application Data

(60) Provisional application No. 60/895,390, filed on Mar. 16, 2007.

(51) Int. Cl.
*H04B 7/15* (2006.01)

(52) U.S. Cl.
USPC .......................................... 455/11.1; 455/205

(58) Field of Classification Search
USPC ......... 455/7, 11.1, 13.1, 15, 16; 370/342, 328
See application file for complete search history.

(56) References Cited

U.S. PATENT DOCUMENTS

| 7,623,487 | B2* | 11/2009 | Zhang et al. .................. 370/328 |
| 7,720,020 | B2* | 5/2010 | Larsson ........................ 370/315 |
| 7,720,484 | B2* | 5/2010 | Parikh et al. .................. 455/450 |
| 2003/0086366 | A1 | 5/2003 | Branlund et al. |
| 2004/0192204 | A1 | 9/2004 | Periyalwar et al. |
| 2004/0203911 | A1* | 10/2004 | Masuda et al. .............. 455/456.1 |
| 2004/0233888 | A1 | 11/2004 | Bonta et al. |
| 2005/0014464 | A1 | 1/2005 | Larsson |
| 2005/0020203 | A1* | 1/2005 | Losh et al. ................... 455/11.1 |
| 2005/0232183 | A1* | 10/2005 | Sartori et al. ................. 370/319 |

(Continued)

FOREIGN PATENT DOCUMENTS

| DE | 10145759 | 4/2003 |
| EP | 0684744 A2 | 11/1995 |

(Continued)

OTHER PUBLICATIONS

Partial International Search Report—PCT/US08/057125—International Search Authority, European Patent Office—Sep. 23, 2008.

(Continued)

*Primary Examiner* — Tu X Nguyen
(74) *Attorney, Agent, or Firm* — Tyler J. Overall

(57) ABSTRACT

Techniques to support multihop relay in a wireless communication system are described. In an aspect, a relay station receives data and a first pilot from an upstream station, e.g., a base station or another relay station. The relay station derives a channel estimate based on the first pilot and performs detection for the data based on the channel estimate. The relay station resends the data and sends a second pilot to a downstream station, e.g., a subscriber station or another relay station. Each pilot may be sent in accordance with a pilot format selected for that pilot. The first and second pilots may be sent using the same or different pilot formats. The relay station may receive channel information from the second station and may forward the channel information to the first station and/or select a rate for data transmission to the second station based on the channel information.

44 Claims, 12 Drawing Sheets

(56) References Cited

U.S. PATENT DOCUMENTS

| | | | |
|---|---|---|---|
| 2006/0098592 A1 | 5/2006 | Proctor, Jr. et al. | |
| 2007/0060050 A1 | 3/2007 | Lee et al. | |
| 2007/0153922 A1* | 7/2007 | Dong et al. | 375/260 |
| 2008/0025251 A1* | 1/2008 | Lee et al. | 370/328 |
| 2008/0095135 A1* | 4/2008 | Cleveland | 370/342 |
| 2009/0011700 A1 | 1/2009 | Nishio et al. | |

FOREIGN PATENT DOCUMENTS

| | | |
|---|---|---|
| EP | 1542488 A1 | 6/2005 |
| EP | 1564911 A1 | 8/2005 |
| EP | 1566900 | 8/2005 |
| EP | 1643669 A1 | 4/2006 |
| EP | 1744502 A1 | 1/2007 |
| EP | 1848124 | 10/2007 |
| EP | 1850509 | 10/2007 |
| JP | 2002330112 A | 11/2002 |
| JP | 2006074325 A | 3/2006 |
| RU | 2154901 | 8/2000 |
| RU | 2207723 C1 | 6/2003 |
| WO | WO9960721 | 11/1999 |
| WO | WO2004038985 A2 | 5/2004 |
| WO | WO2005060298 A1 | 6/2005 |
| WO | WO2006022530 A1 | 3/2006 |
| WO | WO2006034578 A1 | 4/2006 |
| WO | 2006088105 | 8/2006 |

OTHER PUBLICATIONS

Markus Herdin, et al., "Pilot Design for OFDM Amplify-and-Forward with Chunk Reordering," Wireless Communications and Networking Conference, Mar. 1, 2007, pp. 1400-1405.
International Search Report—PCT/US08/057125—International Search Authority, European Patent Office—Nov. 20, 2008.
Written Opinion—PCT/US08/057125—International Search Authority, European Patent Office—Nov. 20, 2008.
European Search Report—EP10171144, Search Authority—The Hague Patent Office, Aug. 16, 2010.
European Search Report—EP10171145, Search Authority—The Hague Patent Office, Aug. 16, 2010.
European Search Report—EP10171146, Search Authority—The Hague Patent Office, Aug. 16, 2010.
Larsson P et al: "Multiuser diversity forwarding in multihop packet radio networks" IEEE Wireless Communications and Networking Conference, vol . 4, Mar. 13, 2005, pp. 2188-2194, XP010791518 IEEE, Piscataway, NJ, USA 001: 10.1109/WCNC. 2005.
Hart M., et al., "Frame structure for multihop relaying support", IEEE 802.16 Broadband Wireless Access Working Group, Nov. 7, 2006, Internet <URL:http://ieee802.org/16/relay/contrib/C80216j-06_138.pdf>.
Ren F.C., et al., "Recommendation on PMP Mode Compatible TDD Frame Structure", IEEE C802.16mmr-05/027r1, Nov. 15, 2005, Internet<URL:http://ieee802.org/16/sg/mmr/contrib/C80216mmr-05_027r1.pdf>.
Taiwanese Search report—097109408—TIPO—Jun. 13, 2011.
European Search Report and European Search Opinion—EP12151318, Search Authority—The Hague Patent Office, Feb. 8, 2012.
Kang H., et al., "Relay zone indicator", IEEE C802.16j-07/235, Mar. 5, 2007, URL:http://ieee802.org/16/relay/contrib/C80216j-07_235. pdf.
IEEE Std 802.16e-2005, "Part 16: Air Interface for Fixed and Mobile Broadband Wireless Access Systems Amendment 2: Physical and Medium Access Control Layers for Combined Fixed and Mobile Operation in Licensed Bands", Feb. 28, 2006, pp. 529, 564, 572, 576-577.
Taiwan Search Report—TW097109408—TIPO—Mar. 19, 2013.

* cited by examiner

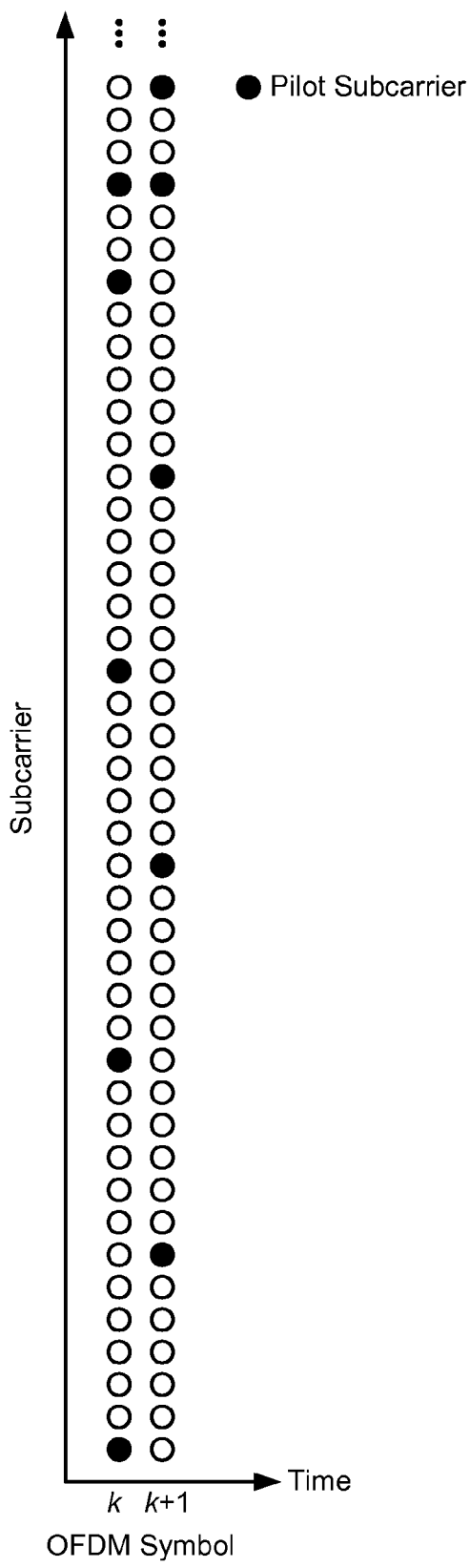
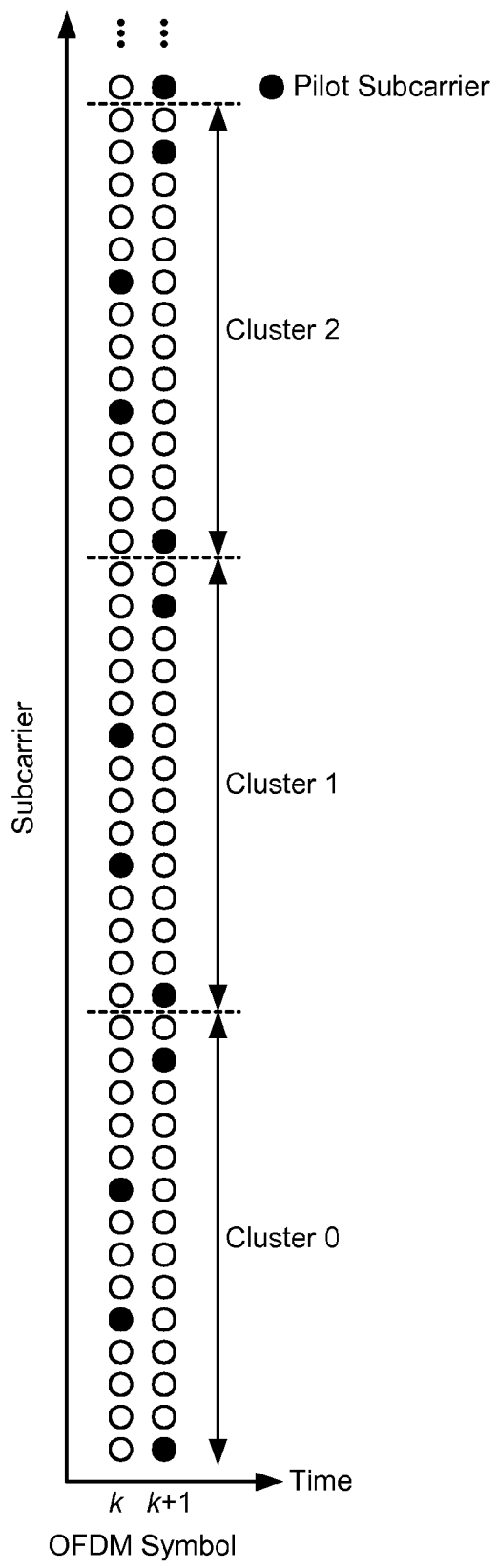
FIG. 3
FIG. 4

PILOT TRANSMISSION BY RELAY STATIONS IN A MULTIHOP RELAY COMMUNICATION SYSTEM

The present application claims priority to provisional U.S. Application Ser. No. 60/895,390, entitled "PILOT TRANSMISSION BY RELAYS IN A MULTIHOP RELAY SYSTEM," filed Mar. 16, 2007, assigned to the assignee hereof and incorporated herein by reference in its entirety.

BACKGROUND

I. Field

The present disclosure relates generally to communication, and more specifically to techniques for supporting multihop relay in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems. Wireless systems have established themselves as a growing area in the field of telecommunications. The current trends and demands are to deliver multimedia services such as voice, video, interactive games, etc., with guaranteed Quality of Service (QoS). High data transmission capability is desirable in order to support high quality multimedia services.

A wireless communication system may support multihop relay in order to improve coverage and/or performance. With multihop relay, a base station may transmit data to a subscriber station via one or more relay stations. Each relay station may receive the data from an upstream station (e.g., the base station or another relay station) and may retransmit the data to a downstream station (e.g., the subscriber station or another relay station). A transmission from one station to another station is considered as a hop. It may be desirable for each relay station to retransmit the data as efficiently as possible and in a manner that is transparent to the subscriber station.

SUMMARY

Techniques to support multihop relay in a wireless communication system are described herein. In an aspect, a relay station receives data and a first pilot from an upstream station, e.g., a base station or another relay station. The relay station resends the data and sends a second pilot to a downstream station, e.g., a subscriber station or another relay station. Pilot is a transmission that is known a priori by both a transmitting station and a receiving station. The first pilot allows the relay station to recover the data sent by the upstream station. The second pilot allows the downstream station to recover the data resent by the relay station. Each pilot may be sent in accordance with a pilot format selected for that pilot. The first and second pilots may be sent with the same or different pilot formats.

In one design, a relay station may receive data and a first pilot from a first station (e.g., a base station). The relay station may derive a channel estimate based on the first pilot and then perform detection for the data based on the channel estimate. The relay station may resend the data and send a second pilot to a second station (e.g., a subscriber station). The relay station may receive channel information from the second station and may forward the channel information to the first station. Alternatively or additionally, the relay station may select a rate for data transmission to the second station based on the channel information.

In one design, a subscriber station may receive data and pilot from a relay station. The subscriber station may derive a channel estimate based on the pilot and then perform detection for the data based on the channel estimate. The subscriber station may determine channel information based on the pilot and send the channel information to the relay station.

Various aspects and features of the disclosure are described in further detail below.

BRIEF DESCRIPTION OF THE DRAWINGS

FIG. 3 shows a subcarrier structure for full usage of subcarriers (FUSC).

FIG. 4 shows a subcarrier structure for partial usage of subcarriers (PUSC).

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.11 (which is also referred to as Wi-Fi), IEEE 802.16 (which is also referred to as WiMAX), IEEE 802.20, Flash-OFDM®, etc. These various radio technologies and standards are known in the art. The terms "radio technology", "radio access technology", and "air interface" are often used interchangeably.

For clarity, certain aspects of the techniques are described below for WiMAX, which is covered in IEEE 802.16, entitled "Part 16: Air Interface for Fixed and Mobile Broadband Wireless Access Systems," Oct. 1, 2004, IEEE 802.16e, entitled "Part 16: Air Interface for Fixed and Mobile Broadband Wireless Access Systems Amendment 2: Physical and Medium Access Control Layers for Combined Fixed and Mobile Operation in Licensed Bands," Feb. 28, 2006, and IEEE 802.16j, entitled "Part 16: Air Interface for Fixed and Mobile Broadband Wireless Access Systems Multihop Relay Specification," Dec. 24, 2007. These documents are publicly available. The techniques may also be used for IEEE 802.16m, which is a new air interface being developed for WiMAX. IEEE 802.16j covers multihop relay and is intended to enhance performance of IEEE 802.16 standards by introducing relay stations. Some objectives of IEEE 802.16j include extending coverage area, enhancing throughput and system capacity, saving battery life of subscriber stations, and minimizing complexity of relay stations.

Figure 1:
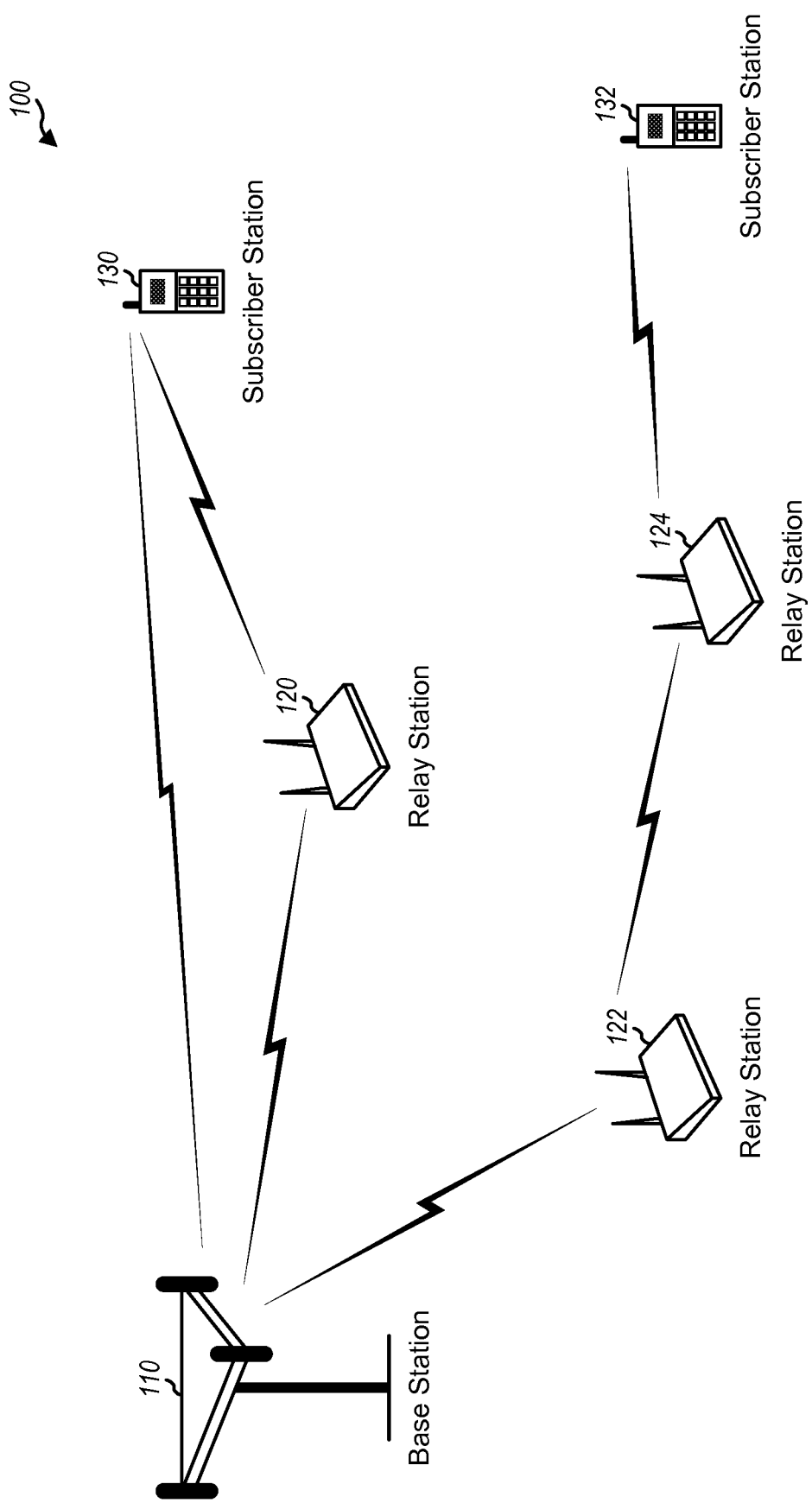
FIG. 1 shows a wireless communication system supporting multihop relay.

FIG. 1 shows a wireless communication system 100 that supports multihop relay. For simplicity, FIG. 1 shows only one base stations (BS) 110, three relay stations (RS) 120, 122 and 124, and two subscriber stations (SS) 130 and 132. In general, a system may include any number of base stations and any number of relay stations that support communication for any number of subscriber stations. A base station is a station that supports communication for subscriber stations. A base station may perform functions such as connectivity, management, and control of relay stations and subscriber stations. A base station may also be referred to as a Node B, an evolved Node B, an access point, etc. A relay station is a station that provides connectivity to other relay stations and/or subscriber stations. A relay station may also provide management and control of subordinate relay stations and/or subscriber stations. The air interface between a relay station and a subscriber station may be identical to the air interface between a base station and a subscriber station. A base station may be coupled to a core network via a backhaul (not shown in FIG. 1) in order to support various services. A relay station may or may not be directly coupled to the backhaul and may have limited functionality to support multihop communication via that relay station.

Subscriber stations may be dispersed throughout the system, and each subscriber station may be stationary or mobile. A subscriber station may also be referred to as a mobile station, a terminal, an access terminal, a user equipment, a subscriber unit, a station, etc. A subscriber station may be a cellular phone, a personal digital assistant (PDA), a wireless device, a wireless modem, a handheld device, a laptop computer, a cordless phone, etc. A subscriber station may communicate with a base station and/or a relay station via the downlink (DL) and uplink (UL). The downlink (or forward link) refers to the communication link from the base station or the relay station to the subscriber station. The uplink (or reverse link) refers to the communication link from the subscriber station to the base station or the relay station.

In the example shown in FIG. 1, base station 110 may communicate with subscriber station 130 via relay station 120. Base station 110 may transmit data for subscriber station 130 on the downlink. Relay station 120 may receive the data from base station 110 and may retransmit the data on the downlink to subscriber station 130. Base station 110 and subscriber station 130 may also be able to communicate directly with one another.

Base station 110 may also communicate with subscriber station 132 via relay stations 122 and 124. Base station 110 may transmit data for subscriber station 132 on the downlink. Relay station 122 may receive the data from base station 110 and may retransmit the data to relay station 124. Relay station 124 may receive the data from relay station 122 and may retransmit the data on the downlink to subscriber station 132. Base station 110 may not be able to communicate directly with subscriber station 132 and may rely on one or more relay stations for communication with subscriber station 132.

FIG. 1 shows an example of 2-hop communication between base station 110 and subscriber station 130. FIG. 1 also shows an example of 3-hop communication between base station 110 and subscriber station 132. In general, a base station and a subscriber station may communicate via any number of hops.

IEEE 802.16 utilizes orthogonal frequency division multiplexing (OFDM) for the downlink and uplink. OFDM partitions the system bandwidth into multiple ($N_{FFT}$) orthogonal subcarriers, which may also be referred to as tones, bins, etc. Each subcarrier may be modulated with data or pilot. The number of subcarriers may be dependent on the system bandwidth as well as the spacing between adjacent subcarriers. For example, $N_{FFT}$ may be equal to 128, 256, 512, 1024 or 2048. Only a subset of the $N_{FFT}$ total subcarriers may be usable for transmission of data and pilot, and the remaining subcarriers may serve as guard subcarriers to allow the system to meet spectral mask requirements. A data subcarrier is a subcarrier used for data, and a pilot subcarrier is a subcarrier used for pilot. An OFDM symbol may be transmitted in each OFDM symbol period (or simply, a symbol period) and may include data subcarriers used to send data, pilot subcarriers used to send pilot, and guard subcarriers not used for data or pilot.

Figure 2:
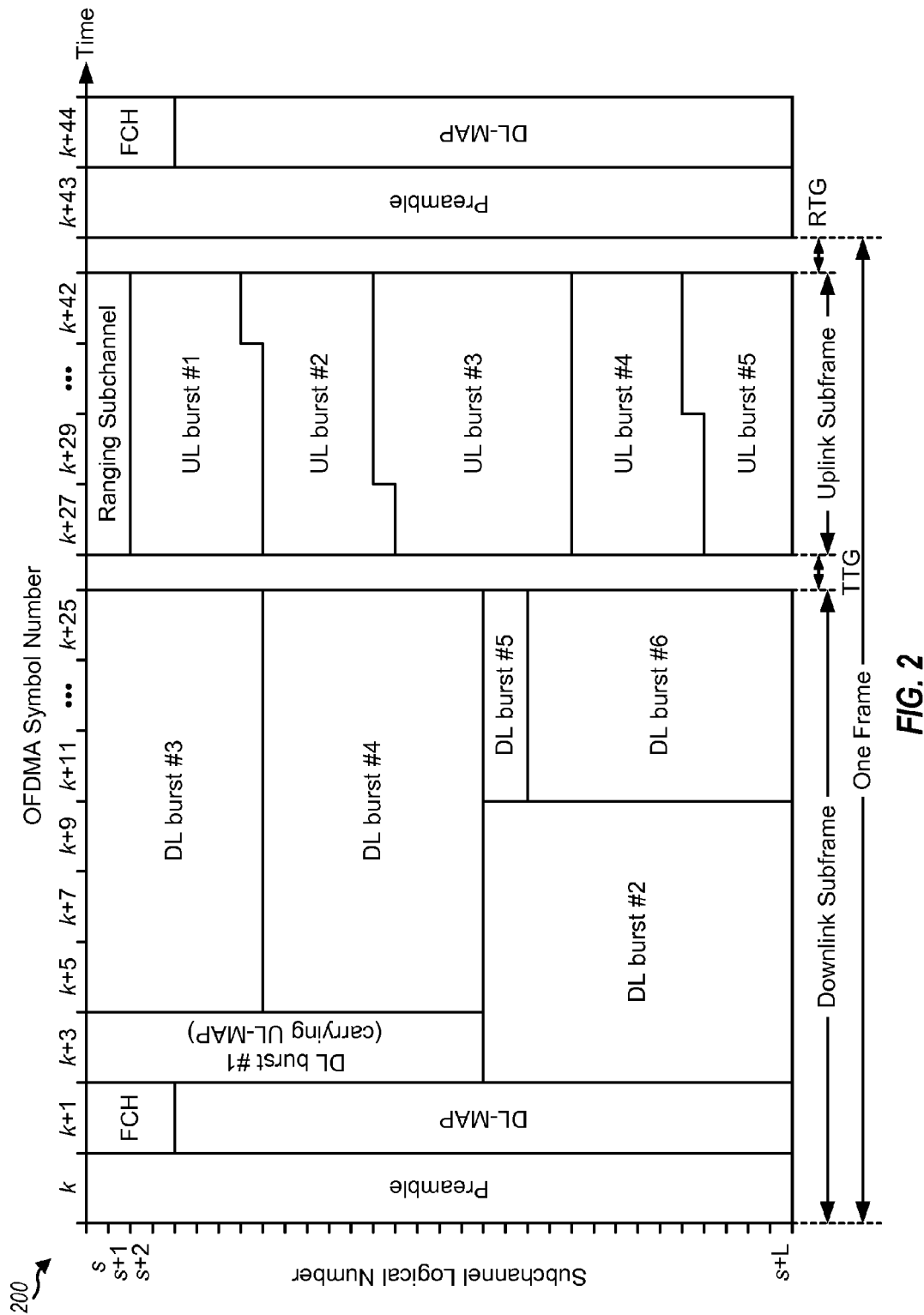
FIG. 2 shows a frame structure without multihop relay

FIG. 2 shows an example frame structure 200 without multihop relay for a time division duplex (TDD) mode in IEEE 802.16. The transmission timeline may be partitioned into units of frames. Each frame may span a predetermined time duration, e.g., 5 milliseconds (ms), and may be partitioned into a downlink subframe and an uplink subframe. The downlink and uplink subframes may be separated by a transmit transmission gap (TTG) and a receive transmission gap (RTG).

A number of physical subchannels may be defined. Each physical subchannel may include a set of subcarriers that may be contiguous or distributed across the system bandwidth. A number of logical subchannels may also be defined and may be mapped to the physical subchannels based on a known mapping. The logical subchannels may simplify the allocation of resources.

As shown in FIG. 2, a downlink subframe may include a preamble, a frame control header (FCH), a downlink map (DL-MAP), an uplink map (UL-MAP), and downlink (DL) bursts. The preamble may carry a known transmission that may be used by subscriber stations for frame detection and synchronization. The FCH may carry parameters used to receive the DL-MAP, the UL-MAP, and the downlink bursts. The DL-MAP may carry a DL-MAP message, which may include information elements (IEs) for various types of control information (e.g., resources allocation) for downlink access. The UL-MAP may carry a UL-MAP message, which may include IEs for various types of control information for uplink access. The downlink bursts may carry data for the subscriber stations being served. An uplink subframe may include uplink bursts, which may carry data from the subscriber stations scheduled for uplink transmission.

In general, the downlink and uplink subframes may cover any fraction of a frame. In the example shown in FIG. 2, a frame includes 43 OFDM symbols, the downlink subframe includes 27 OFDM symbols, and the uplink subframe includes 16 OFDM symbols. The frame, downlink subframe, and uplink subframe may also have other durations, which may be fixed or configurable.

IEEE 802.16 supports FUSC, PUSC, and band AMC for data transmission on the downlink. For FUSC, each subchannel includes a set of subcarriers from across the system bandwidth. For PUSC, the subcarriers are arranged in groups, and each subchannel includes a set of subcarriers from across a single group. For band AMC, each subchannel includes a set of contiguous subcarriers. A downlink subframe may include zero or more FUSC zones, zero or more PUSC zones, and zero or more band AMC zones. Each zone includes all $N_{FFT}$ subcarriers in one or more consecutive OFDM symbols.

FIG. 3 shows a subcarrier structure for FUSC. In each OFDM symbol, pilot subcarriers are located uniformly across the available subcarriers and are spaced apart by 12 subcarriers. The pilot subcarriers in the even-numbered OFDM symbols are staggered by six subcarriers from the pilot subcarriers in the odd-numbered OFDM symbols. Each OFDM symbol also includes a set of fixed pilot subcarriers (e.g., subcarriers 39, 261, ..., 1701). Of the remaining subcarriers, most are used for data and some are used as guard subcarriers. For FUSC, a subchannel includes 48 data subcarriers distributed across the system bandwidth.

FIG. 4 shows a subcarrier structure for PUSC. The available subcarriers are arranged into clusters, with each cluster including 14 consecutive subcarriers. In each even-numbered OFDM symbol, the fifth and ninth subcarriers in each cluster are pilot subcarriers, and the remaining 12 subcarriers are data subcarriers. In each odd-numbered OFDM symbol, the first and eleventh subcarriers in each cluster are pilot subcarriers, and the remaining 12 subcarriers are data subcarriers. The clusters are arranged into groups, with each group including 24 clusters. For PUSC, a subchannel includes 24 data subcarriers distributed across one group.

Figure 5:
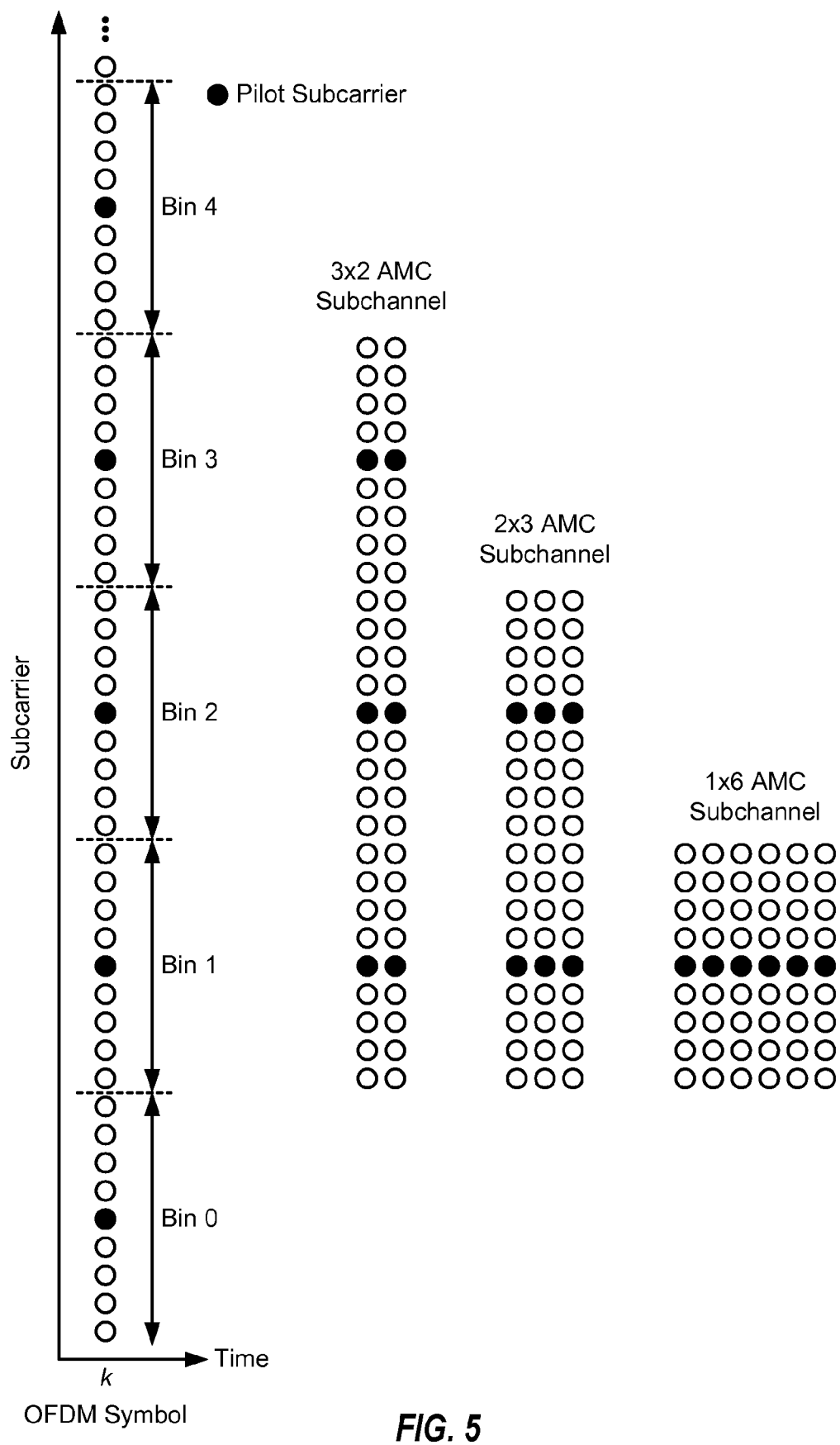
FIG. 5 shows a subcarrier structure for band adaptive modulation and coding (AMC).

FIG. 5 shows a subcarrier structure for band AMC. The available subcarriers are arranged into bins, with each bin including 9 consecutive subcarriers. The center subcarrier in each bin is a pilot subcarrier, and the remaining 8 subcarriers are data subcarriers. For band AMC, a subchannel may include one bin in six consecutive OFDM symbols, two bins in three consecutive OFDM symbols, or three bins in two consecutive OFDM symbols.

A subscriber station may be assigned one or more slots for data transmission on the downlink. A slot is a minimum data allocation unit. For downlink FUSC, a slot is one subchannel (with 48 data subcarriers) in one OFDM symbol. For downlink PUSC, a slot is one subchannel (with 24 data subcarriers) in two OFDM symbols. For band AMC, a slot is 8, 16 or 24 data subcarriers in 6, 3 or 2 OFDM symbols, respectively.

FIGS. 3, 4 and 5 show three pilot formats that may be used for sending pilot. Other pilot formats may also be defined. As an example, for band AMC, the pilot subcarriers may be staggered across OFDM symbols instead of being at the same location as shown in FIG. 5. If multiple transmit antennas are used for transmission, then the same or different pilot formats may be used for these multiple transmit antennas. The slots, subchannels, and pilots for FUSC, PUSC, and band AMC are described in the aforementioned IEEE 802.16 documents.

A base station may transmit data directly to a subscriber station using frame structure 200 in FIG. 2. The subscriber station may perform frame detection and synchronization based on the preamble and obtain parameters from the FCH. The subscriber station may then process the DL-MAP to obtain a DL-MAP message that may indicate a downlink burst in slots assigned to the subscriber station. The subscriber station may then process the downlink burst to recover the data sent to the subscriber station. To recover the data, the subscriber station may first obtain a channel estimate for the data subcarriers in the downlink burst based on pilot sent on the pilot subcarriers. The location of the data and pilot subcarriers may be dependent on whether the data was sent using FUSC, PUSC, or band AMC. The subscriber station may then perform detection for the data subcarriers based on the channel estimate. The pilot subcarriers thus carry important information used by the subscriber station to recover the data.

As shown in FIG. 1, a base station may transmit data to a subscriber station via one or more relay stations. The system may support a transparent mode and a non-transparent mode. Table 1 lists some characteristics of the transparent mode and non-transparent mode, which are described in detail in the aforementioned IEEE 802.16j document.

TABLE 1

| Mode | Description |
| --- | --- |
| Transparent mode | Base station schedules transmission on the downlink, generates assignment messages, and coordinates retransmission by relay stations.<br>Relay station retransmits data received from the base station but does not transmit preamble, FCH or MAP.<br>Subscriber station receives assignment messages from the base station and receives data from the relay station. |
| Non-transparent mode | Base station schedules transmission for the first hop.<br>Relay station can schedule retransmission for subsequent hop and generate assignment messages. Relay station retransmits data received from the base station and also transmits preamble, FCH and MAP.<br>Subscriber station receives assignment messages and data from the relay station. |

Figure 6:
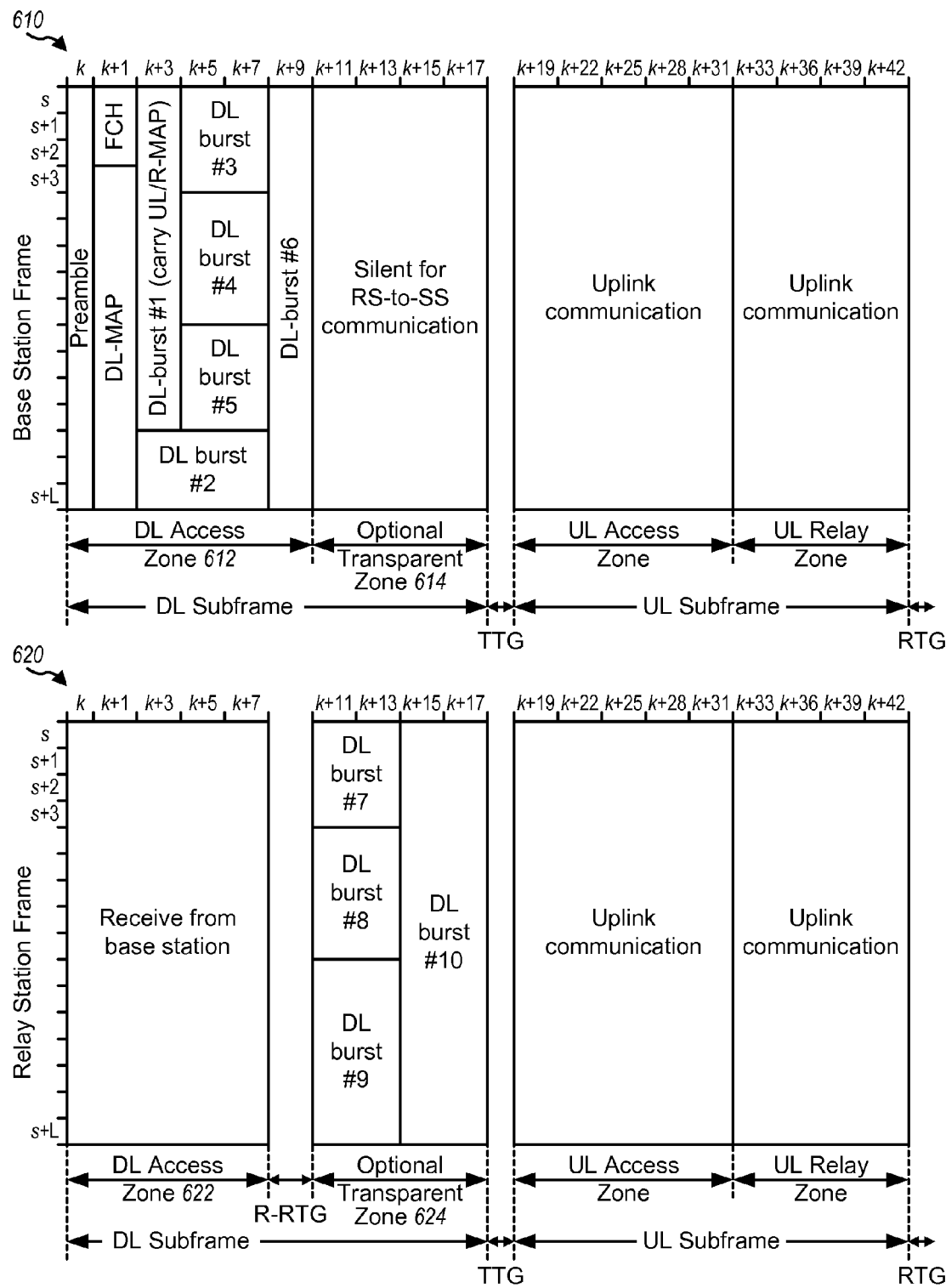
FIG. 6 shows a frame structure for multihop relay in a transparent mode.

FIG. 6 shows a frame structure for multihop relay in the transparent mode. The top half of FIG. 6 shows a frame 610 for a base station, and the bottom half of FIG. 6 shows a frame 620 for a relay station. Only the downlink subframes of frames 610 and 620 are described below.

For frame 610, the downlink subframe may be partitioned into a downlink access zone 612 and an optional transparent zone 614. Each zone may include any number of OFDM symbols, which may be configurable and determined by the base station. In the example shown in FIG. 6, downlink access zone 612 includes OFDM symbols k through k+10, and optional transparent zone 614 includes OFDM symbols k+11 through k+17. The base station may transmit a preamble, an FCH, a DL-MAP, a UL-MAP, a relay MAP (R-MAP), and downlink bursts in downlink access zone 612, e.g., in similar manner as described above for FIG. 2. The R-MAP may carry an R-MAP message that may convey the detailed allocation for the relay station in optional transparent zone 614. The base station may or may not transmit during optional transparent zone 614.

For frame 620, the downlink subframe may also be partitioned into a downlink access zone 622 and an optional transparent zone 624 that are time-aligned with downlink access zone 612 and optional transparent zone 614 of frame 610. Downlink access zone 622 and optional transparent zone 624 are separated by a relay receive/transmit transition gap (R-RTG), which is given in an integer number of OFDM symbols. The relay station may receive the preamble, FCH, DL-MAP, UL-MAP, R-MAP, and downlink bursts from the base station during downlink access zone 622. The relay station may ignore downlink burst #6, which overlaps the R-RTG and may be intended for a subscriber station. The relay station may retransmit some or all of the data received from the base station in optional transparent zone 624 as indicated by the R-MAP message.

In the transparent mode, the base station may send a DL-MAP message that conveys the downlink burst assigned to each subscriber station being served. Each subscriber station may receive the DL-MAP message from the base station and may process the assigned downlink burst, which may be transmitted by the base station or the relay station. A subscriber station may thus receive the preamble, FCH, and DL-MAP message from the base station but may receive data from the relay station. The relay station may receive the data from the base station and retransmit the data as indicated by the base station.

Figure 7:
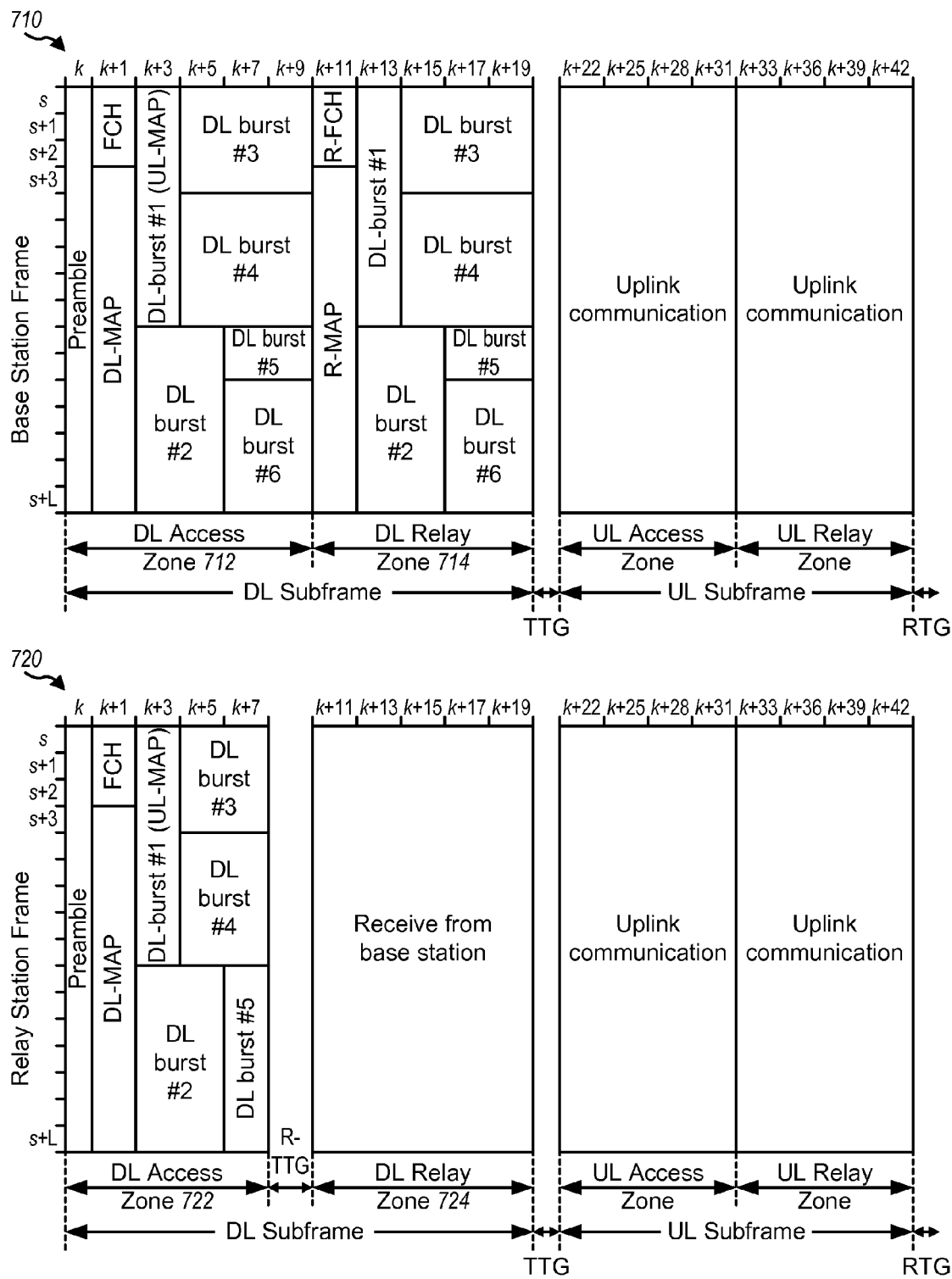
FIG. 7 shows a frame structure for multihop relay in a non-transparent mode.

FIG. 7 shows a frame structure for multihop relay in the non-transparent mode. The top half of FIG. 7 shows a frame 710 for a base station, and the bottom half of FIG. 7 shows a frame 720 for a relay station. Only the downlink subframes of frames 710 and 720 are described below.

For frame 710, the downlink subframe may be partitioned into a downlink access zone 712 and a downlink relay zone 714. Each zone may include any number of OFDM symbols, which may be configurable and determined by the base station. The base station may transmit a preamble, an FCH, a DL-MAP, a UL-MAP, and downlink bursts in downlink access zone 712 directly to subscriber stations. The base station may transmit a relay FCH (R-FCH), an R-MAP, and downlink bursts in downlink relay zone 714 to the relay station.

For frame 720, the downlink subframe may also be partitioned into a downlink access zone 722 and a downlink relay zone 724 that are time-aligned with downlink access zone 712 and downlink relay zone 714 of frame 710. The relay station may receive the R-FCH, R-MAP, and downlink bursts from the base station during downlink relay zone 724. The relay station may transmit a preamble, an FCH, a DL-MAP, a UL-MAP, and downlink bursts for some or all of the data received from the base station in downlink access zone 722 of the next frame. There is thus a delay of one frame for the data retransmitted by the relay station.

In the non-transparent mode, the base station may send an R-MAP message that may convey the downlink burst for each relay station in downlink relay zone 714. The relay station may receive the data from the base station as indicated by the R-MAP message. The relay station may transmit a preamble, an FCH, a DL-MAP, a UL-MAP, and downlink bursts containing the data received from the base station in downlink access zone 722 to subscriber stations. The DL-MAP message may convey the downlink burst assigned by the relay station to each subscriber station. Each subscriber station may receive the preamble, the FCH, the DL-MAP message, and the data from the relay station and may not need to receive anything from the base station.

Figure 8:
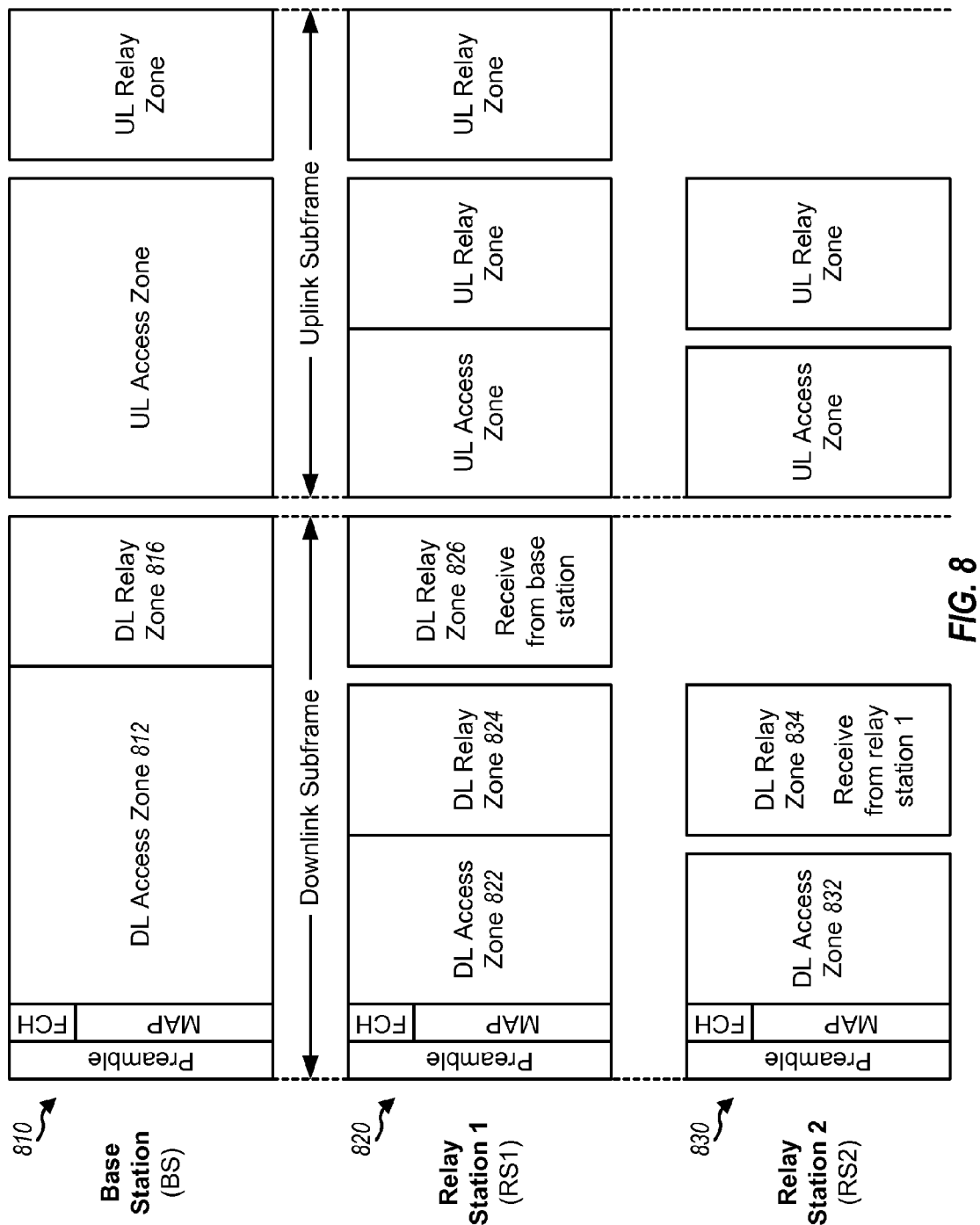
FIGS. 8 and 9 show two frame structures for three hops in the non-transparent mode.

FIG. 8 shows a frame structure for three hops in the non-transparent mode. The top of FIG. 8 shows a frame 810 for a base station, the middle of FIG. 8 shows a frame 820 for a first relay station (RS1), and the bottom of FIG. 8 shows a frame 830 for a second relay station (RS2).

For frame 810, the downlink subframe may be partitioned into a downlink access zone 812 and a downlink relay zone 816. Each zone may include any number of OFDM symbols. The base station may transmit a preamble, an FCH, a DL-MAP, a UL-MAP, and downlink bursts in downlink access zone 812 directly to subscriber stations. The base station may transmit an R-FCH, an R-MAP, and downlink bursts in downlink relay zone 816 to the first relay station.

For frame 820, the downlink subframe may be partitioned into a downlink access zone 822 and downlink relay zones 824 and 826. Downlink access zone 822 and downlink relay zone 824 are time-aligned with downlink access zone 812 of frame 810. Downlink relay zone 826 is time-aligned with downlink relay zone 816 of frame 810. The first relay station may receive the R-FCH, the R-MAP, and the downlink bursts from the base station during downlink relay zone 826. The first relay station may transmit a preamble, an FCH, a DL-MAP, a UL-MAP, and downlink bursts for some of the data received from the base station to subscriber stations in downlink access zone 822 of the next frame. The data sent by the first relay station in downlink access zone 822 may be for subscriber stations that do not need the second relay station. The first relay station may also retransmit some of the data received from the base station to the second relay station in downlink relay zone 824 of the next frame.

For frame 830, the downlink subframe may be partitioned into a downlink access zone 832 and a downlink relay zone 834. Downlink access zone 832 and downlink relay zone 834 are time-aligned with downlink access zone 822 and downlink relay zone 824 of frame 820. The second relay station may receive data from the first relay station in downlink relay zone 834. The second relay station may transmit a preamble, an FCH, a DL-MAP, a UL-MAP, and downlink bursts for the data received from the first relay station to subscriber stations in downlink access zone 832 of the next frame.

Figure 9:
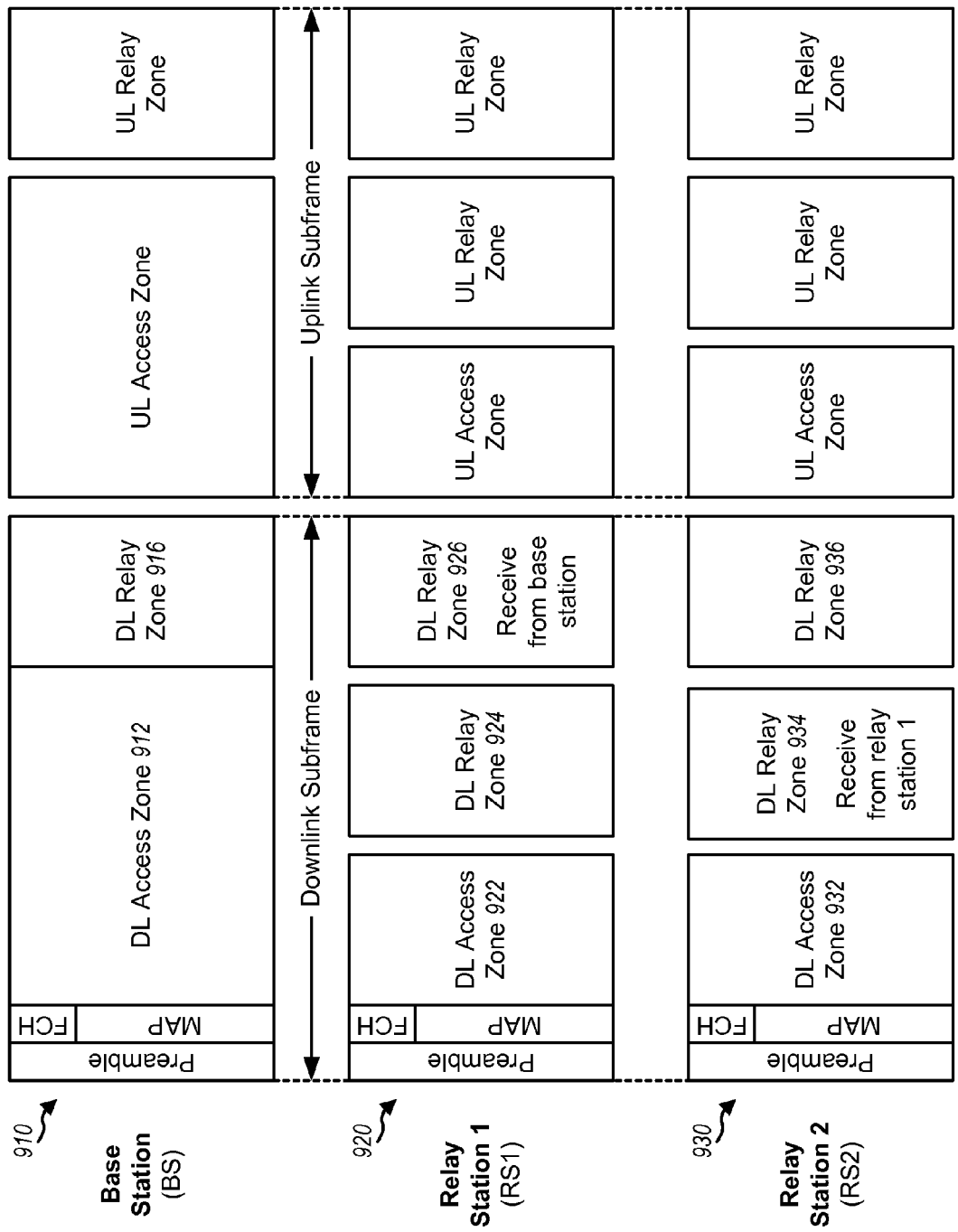

FIG. 9 shows another frame structure for three hops in the non-transparent mode. The top of FIG. 9 shows a frame 910 for a base station, the middle of FIG. 9 shows a frame 920 for a first relay station, and the bottom of FIG. 9 shows a frame 930 for a second relay station.

The downlink subframe of frame 910 may be partitioned into a downlink access zone 912 and a downlink relay zone 916. The base station may transmit overhead and data in zones 912 and 916, as described above for zones 812 and 816 in FIG. 8. The downlink subframe of frame 920 may be partitioned into a downlink access zone 922 and downlink relay zones 924 and 926. The first relay station may receive data in zone 926 and may transmit overhead and data in zones 922 and 924, as described above for zones 822, 824 and 826 in FIG. 8.

For frame 930, the downlink subframe may be partitioned into a downlink access zone 932 and downlink relay zones 934 and 936. The second relay station may receive data from the first relay station in downlink relay zone 934. The second relay station may transmit a preamble, an FCH, a DL-MAP, a UL-MAP, and downlink bursts for the data received from the first relay station to subscriber stations in zones 932 and 936 of the next frame.

FIGS. 8 and 9 show two frame structures that support three hops via two relay stations. For these frame structures, there is a delay of one frame for the data retransmitted by the first relay station, and a delay of one frame for the data retransmitted by the second relay station. More than two hops may be supported with other frame structures. More than three hops may also be supported, e.g., with more downlink relay zones. In general, there may be separate zones for base station to subscriber station (BS-SS) communication, relay station to relay station (RS-RS) communication, and relay station to subscriber station (RS-SS) communication.

For BS-SS communication, a subscriber station may receive the pilot sent by a base station and may use this pilot to perform channel estimation and report channel conditions. However, when a relay station transmits to the subscriber station, the base station is not sending pilot. The relay station may itself generate the pilot for the subscriber station.

In an aspect, for RS-RS or RS-SS communication, a relay station may receive data and a first pilot from an upstream station and may retransmit the data and transmit a second pilot to a downstream station. The first pilot allows the relay station to recover the data from the upstream station. The second pilot allows the downstream station to recover the retransmitted data from the relay station. The first and second pilots may be transmitted in the same or different manners, depending on various factors such as the number of hops between a base station and a subscriber station, the order of the relay station in the multihop relay, etc. Each pilot may be transmitted in accordance with a pilot format that indicates how the pilot is to be transmitted. A pilot format may also be referred to as a pilot structure, a pilot scheme, etc.

Figure 10:
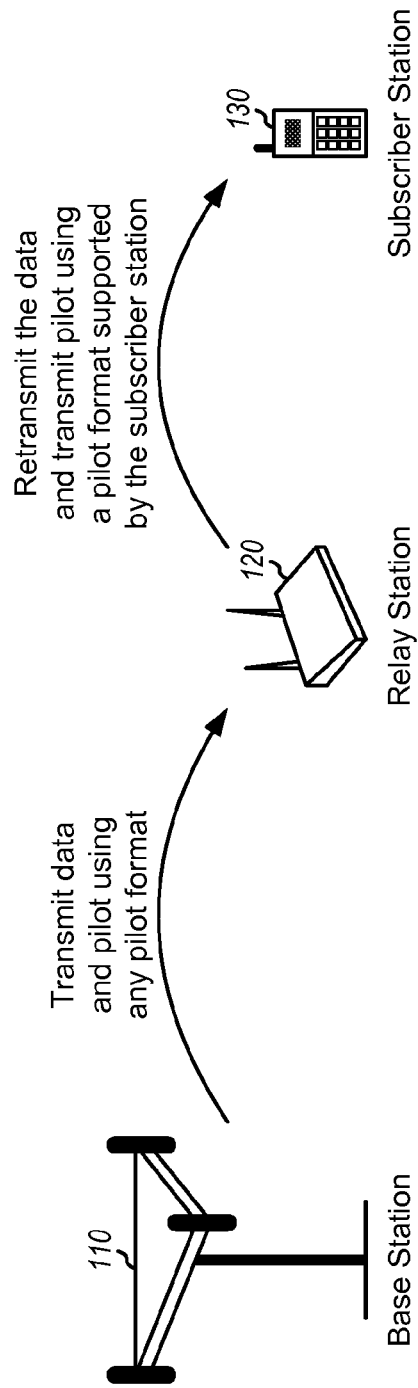
FIG. 10 shows a scheme for transmitting data and pilot in 2-hop relay.

FIG. 10 shows a scheme for transmitting data and pilot in 2-hop relay. Base station 110 may transmit data and pilot to relay station 120, e.g., in downlink access zone 612 in FIG. 6 or downlink relay zone 714 in FIG. 7. Base station 110 may transmit pilot using any of the pilot formats shown in FIGS. 3, 4 and 5 or using some other pilot format for the downlink bursts sent to relay station 120. Since the data and pilot in these downlink bursts are intended for relay station 120 and not for subscriber station 130, the pilot may be transmitted using a pilot format that is not supported by subscriber station 130.

Relay station 120 may retransmit the data and may transmit pilot to subscriber station 130, e.g., in optional transparent zone 624 in FIG. 6 or downlink access zone 722 in FIG. 7. Relay station 120 may transmit pilot using a pilot format supported by subscriber station 130, e.g., using the pilot format shown in FIG. 3, 4 or 5 depending on whether the data is retransmitted using FUSC, PUSC, or band AMC, respectively. This allows subscriber station 130 to receive the retransmitted data and pilot from relay station 120 in the same manner as if the data and pilot were transmitted by base station 110. Subscriber station 130 does not need to be aware of whether the data and pilot are coming from base station 110 or relay station 120.

Figure 11:
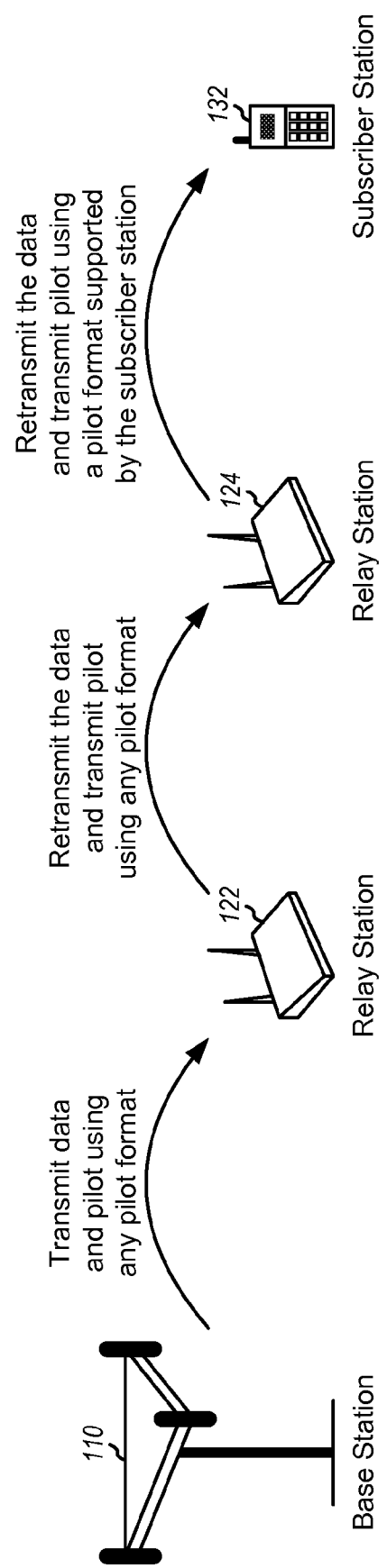
FIG. 11 shows a scheme for transmitting data and pilot in 3-hop relay.

FIG. 11 shows a scheme for transmitting data and pilot in 3-hop relay. Base station 110 may transmit data and pilot to relay station 122, e.g., in downlink relay zone 816 in FIG. 8 or downlink relay zone 916 in FIG. 9. Base station 110 may transmit pilot using any pilot format. Relay station 122 may retransmit the data and may transmit pilot to relay station 124, e.g., in downlink relay zone 824 in FIG. 8 or downlink relay zone 924 in FIG. 9. Relay station 122 may also transmit pilot using any pilot format. Relay station 124 may retransmit the data and may transmit pilot to subscriber station 132, e.g., in downlink access zone 832 in FIG. 8 or downlink access zone 932 in FIG. 9. Relay station 124 may transmit pilot using a pilot format supported by subscriber station 130.

As shown in FIGS. 10 and 11, an upstream station (e.g., a base station or a relay station) may transmit pilot to a downstream relay station using any pilot format. A relay station for the last hop may transmit pilot using a pilot format supported by a subscriber station and in the same manner as the base station. The last relay station may replicate the way the base station would send the pilot if the base station was transmitting. The pilot in the last hop may be dependent on whether data is resent using FUSC, PUSC, or band AMC.

The pilot sent by a base station for BS-RS communication may be the same as the pilot sent by the base station for BS-SS communication or may be customized for the BS-RS communication and entirely different from the pilot for the BS-SS communication. The pilot sent by a relay station for RS-RS communication may be the same as the pilot sent by the base station for BS-SS communication or may be customized for the RS-RS communication and entirely different from the pilot for the BS-SS communication. The pilot sent by a relay station for RS-SS communication may be the same as the pilot sent by the base station for BS-SS communication.

The pilot sent by an upstream station (e.g., a base station or a relay station) to a downstream relay station may be based on a pilot format determined by over-the-air negotiation between the two stations. The upstream station or the downstream relay station may send a signal, a message, or some other information to convey a pilot format to use for the pilot.

Various pilot formats may be used for the pilot sent by the upstream station to the downstream relay station. The pilot may be global and sent on pilot subcarriers distributed across the system bandwidth. The pilot may also be local and sent on pilot subcarriers distributed across a portion of the system bandwidth. Local pilot may support frequency reuse of greater than one.

The number of pilot subcarriers and the location of the pilot subcarriers in each OFDM symbol may be selected to provide good performance. The upstream station and the downstream relay station may observe good channel conditions. Hence, fewer pilot subcarriers may be sufficient to achieve good performance. The number of pilot subcarriers and the location of the pilot subcarriers may be static across all OFDM symbols or may change dynamically from OFDM symbol to OFDM symbol.

In one design, the upstream station may send information indicative of a pilot format being used for the pilot sent to the downstream relay station. The downstream relay station may then receive the pilot in accordance with the pilot format indicated by the upstream station. In another design, the upstream station may send data and pilot in accordance with FUSC, PUSC, or band AMC mode. The downstream relay station may determine the pilot format based on the transmission mode used for the data.

A downstream station (e.g., a subscriber station or a downstream relay station) may use the pilot received from an upstream station (e.g., a relay station or a base station) to perform channel estimation and obtain a channel estimate. The downstream station may use the channel estimate to perform detection/decoding of data received from the upstream station. The downstream station may also obtain channel information based on the pilot. The channel information may comprise a carrier-to-interference-and-noise ratio (CINR), a modulation coding set (MCS), a channel quality indicator (CQI), etc. The channel information may be used by the upstream station or the downstream station for rate selection to select a rate for data transmission from the upstream station to the downstream station.

Figures 12, 13:
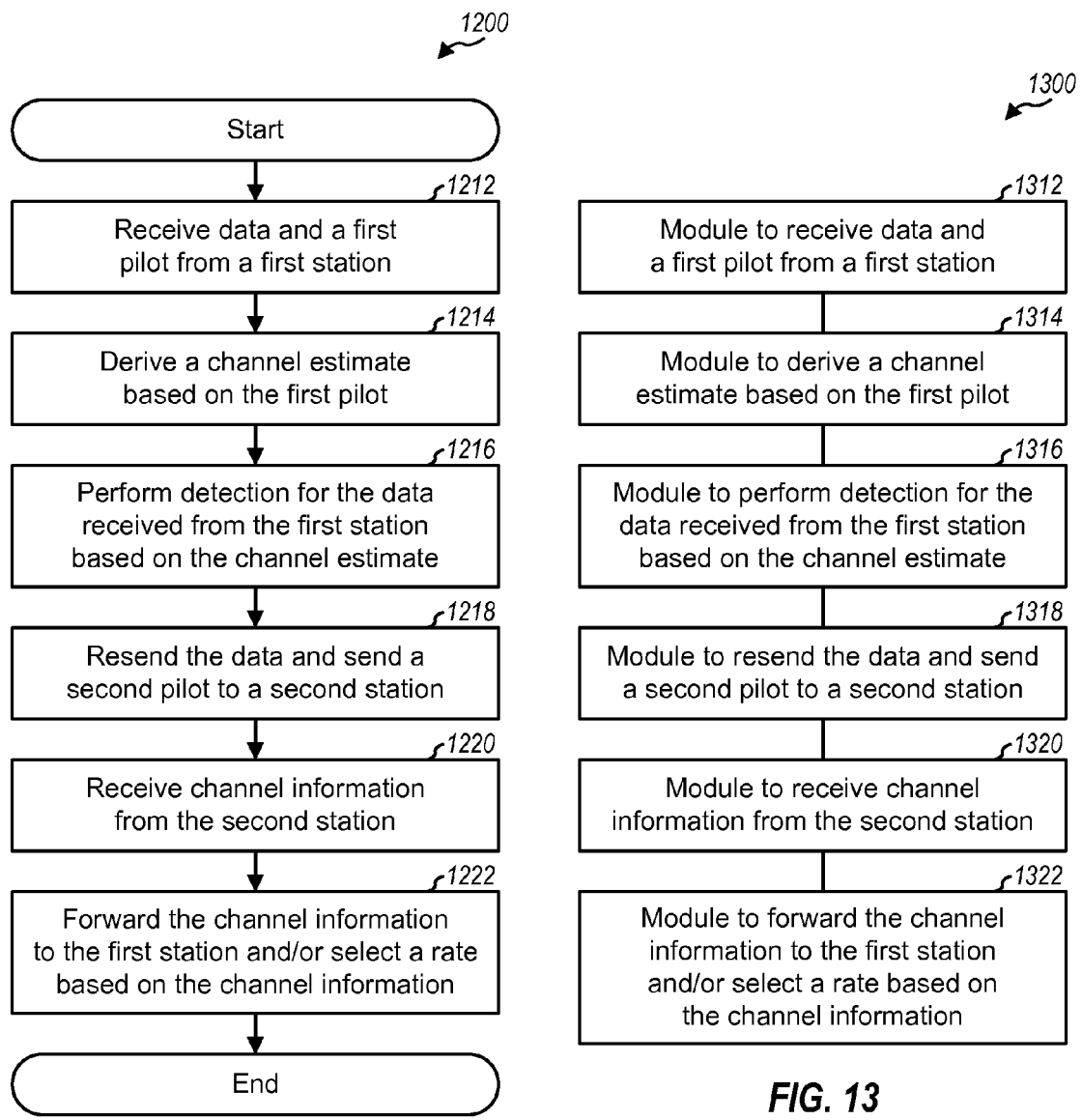
FIG. 12 shows a process for supporting multihop relay by a relay station.
FIG. 13 shows an apparatus for supporting multihop relay.

FIG. 12 shows a design of a process 1200 performed by a relay station to support multihop relay. The relay station may receive data and a first pilot from a first station (block 1212). The relay station may derive a channel estimate based on the first pilot (block 1214) and may then perform detection for the data received from the first station based on the channel estimate (block 1216). The relay station may resend the data and send a second pilot to a second station (block 1218). The relay station may receive channel information from the second station, with the channel information being derived by the second station based on the second pilot (block 1220). The relay station may forward the channel information to the first station and/or may select a rate for data transmission to the second station based on the channel information (block 1222).

For relay station 120 in FIG. 1, the first station may be a base station, and the second station may be a subscriber station. For relay station 122, the first station may be a base station, and the second station may be another relay station. For relay station 124, the first station may be another relay station, and the second station may be a subscriber station. The first and second stations may also be upstream and downstream relay stations, respectively.

Each pilot may be sent on at least one pilot subcarrier in at least one OFDM symbol. The location of the at least one pilot subcarrier may be determined based on a pilot format for the pilot. In one design, the relay station may receive the first pilot in accordance with a first pilot format and may send the second pilot in accordance with a second pilot format that is different from the first pilot format. In another design, the relay station may receive the first pilot in accordance with a pilot format and may send the second pilot in accordance with the same pilot format used for the first pilot. In one design, the relay station may receive from the first station information indicative of a pilot format for the first pilot. The relay station may then receive the first pilot in accordance with the pilot format. In one design, the relay station may receive from the first station information indicative of a pilot format for the second pilot. The relay station may then send the second pilot in accordance with the pilot format.

In one design, the relay station may resend the data in accordance with a transmission mode selected from among multiple transmission modes (e.g., FUSC, PUSC, and band AMC). Each transmission mode may be associated with a different pilot format. The relay station may send the second pilot in accordance with the pilot format associated with the selected transmission mode.

FIG. 13 shows a design of an apparatus 1300 for supporting multihop relay. Apparatus 1300 includes means for receiving data and a first pilot from a first station (module 1312), means for deriving a channel estimate based on the first pilot (module 1314), means for performing detection for the data received from the first station based on the channel estimate (module 1316), means for resending the data and sending a second pilot to a second station (module 1318), means for receiving channel information from the second station (module 1320), and means for forwarding the channel information to the first station and/or selecting a rate for data transmission to the second station based on the channel information (module 1322).

Figure 14:
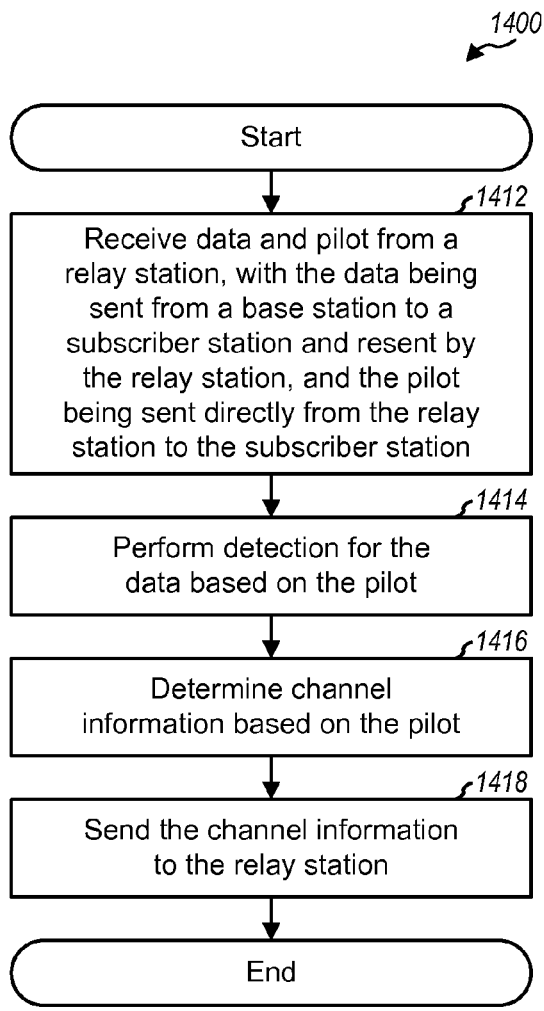
FIG. 14 shows a process for receiving data with multihop relay.

FIG. 14 shows a design of a process 1400 performed by a subscriber station for receiving data with multihop relay. The subscriber station may receive data and pilot from a relay station, with the data being sent from a base station to the subscriber station and resent by the relay station, and the pilot being sent directly from the relay station to the subscriber station (block 1412). The subscriber station may perform detection for the data received from the relay station based on the pilot (block 1414).

In one design (e.g., for a transparent mode), the subscriber station may receive information indicative of a pilot format from the base station. In another design (e.g., for a non-transparent mode), the subscriber station may receive information indicative of a pilot format from the relay station. In both designs, the subscriber station may receive the pilot from the relay station in accordance with the pilot format. In one design that is applicable for both the transparent and non-transparent modes, the subscriber station may receive information indicative of a transmission mode selected from among multiple transmission modes, with each transmission mode being associated with a different pilot format. The subscriber station may then receive the pilot from the relay station in accordance with the pilot format associated with the selected transmission mode.

For block 1414, the subscriber station may derive a channel estimate based on the pilot received from the relay station. The subscriber station may then perform detection for the data received from the relay station based on the channel estimate. The subscriber station may also determine channel information based on the pilot (block 1416) and may send the channel information to the relay station (block 1418).

Figure 15:
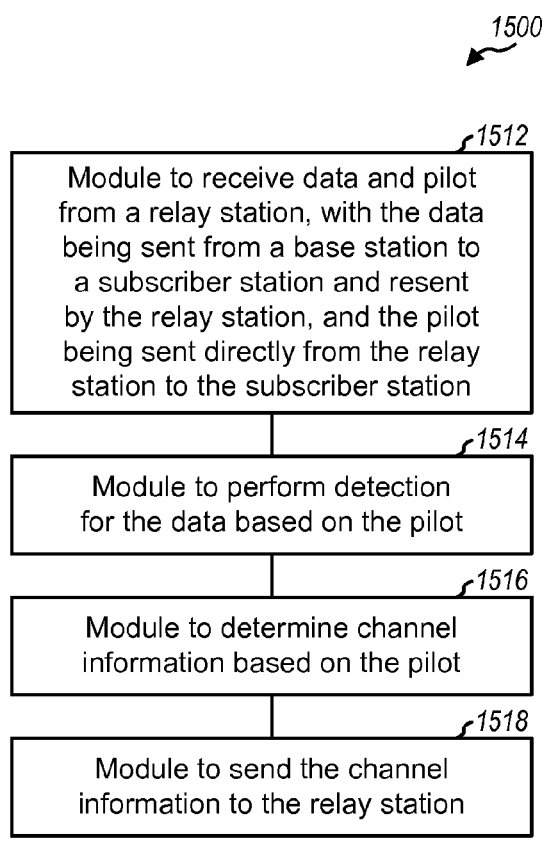
FIG. 15 shows an apparatus for receiving data with multihop relay.

FIG. 15 shows a design of an apparatus 1500 for receiving data with multihop relay. Apparatus 1500 includes means for receiving data and pilot from a relay station, with the data being sent from a base station to a subscriber station and resent by the relay station, and the pilot being sent directly from the relay station to the subscriber station (module 1512), means for performing detection for the data received from the relay station based on the pilot (module 1514), means for determining channel information based on the pilot (module 1516), and means for sending the channel information to the relay station (module 1518).

The modules in FIGS. 13 and 15 may comprise processors, electronics devices, hardware devices, electronics components, logical circuits, memories, etc., or any combination thereof.

For clarity, much of the description above is for data transmission on the downlink from a base station to a subscriber station via one or more relay stations. The techniques described herein may also be used for data transmission on the uplink from a subscriber station to a base station via one or more relay stations. The subscriber station may transmit data and a first pilot using a pilot format supported by the subscriber station. A relay station may receive the data and the first pilot from the subscriber station and may retransmit the data and transmit a second pilot to another relay station or a base station. The second pilot may be sent in any format supported by the relay station and the recipient station.

Figure 16:
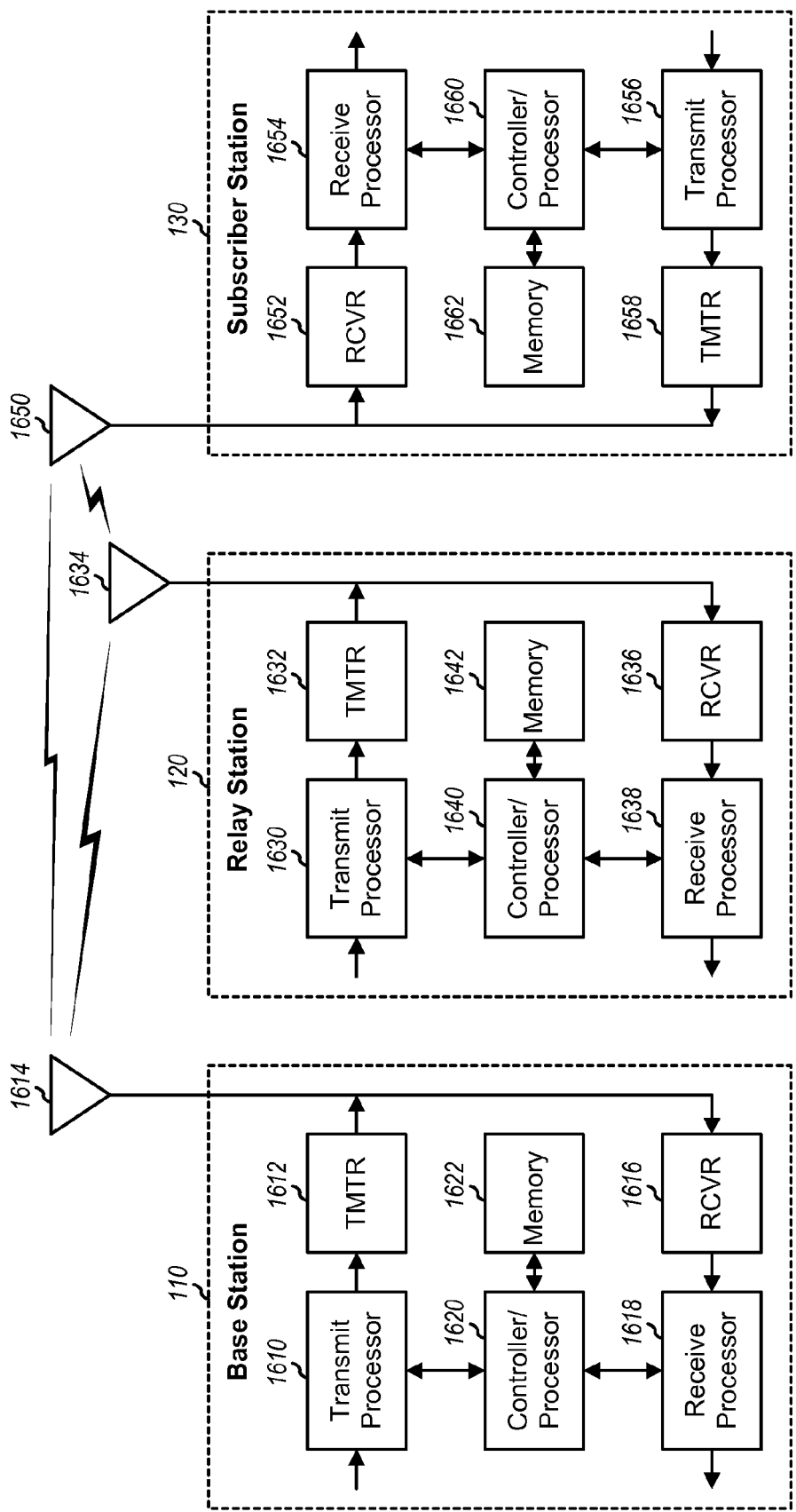
FIG. 16 shows a block diagram of a base station, a relay station, and a subscriber station.

FIG. 16 shows a block diagram of a design of base station 110, relay station 120, and subscriber station 130 in FIG. 1. At base station 110, a transmit processor 1610 receives data for subscriber station 130 and other subscriber stations, processes (e.g., encodes, interleaves, and modulates) the data, and generates data symbols. Transmit processor 1610 also processes overhead information (e.g., MAP messages) and pilot to obtain overhead symbols and pilot symbols, respectively. Transmit processor 1610 further processes the data, overhead, and pilot symbols (e.g., for OFDM) and provides output chips. A transmitter (TMTR) 1612 conditions (e.g., converts to analog, amplifies, filters, and frequency upconverts) the output chips and generates a downlink signal, which is transmitted via an antenna 1614.

At relay station 120, an antenna 1634 receives the downlink signal from base station 110 and provides a received signal to a receiver (RCVR) 1636. Receiver 1636 conditions (e.g., filters, amplifies, frequency downconverts, and digitizes) the received signal and provides samples. A receive processor 1638 processes the samples (e.g., for OFDM) to obtain received symbols, processes received pilot symbols to obtain a channel estimate, and performs detection on received data and overhead symbols with the channel estimate to obtain detected symbols. Receive processor 1638 further processes (e.g., demodulates, deinterleaves, and decodes) the detected symbols to recover the data and overhead information sent by base station 110. A transmit processor 1630 processes the data received from base station 110, overhead information, and pilot to generate data, overhead, and pilot symbols, respectively. Transmit processor 1630 further processes these symbols (e.g., for OFDM) to generate output chips. A transmitter 1632 conditions the output chips and generates a downlink relay signal, which is transmitted via antenna 1634.

At subscriber station 130, the downlink relay signal from relay station 120 is received by an antenna 1650, conditioned by a receiver 1652, and processed by a receive processor 1654 to recover the data resent by relay station 120. The downlink signal from base station 110 is also received by antenna 1650, conditioned by receiver 1652, and processed by receive processor 1654 to recover overhead sent by base station 110 in the transparent mode. Data, signaling (e.g., channel information), and pilot to send on the uplink are processed by a transmit processor 1656 and conditioned by a transmitter 1658 to generate an uplink signal, which is transmitted via antenna 1650.

Relay station 120 receives and processes the uplink signal from subscriber station 130 to recover the data and signaling sent by the subscriber station. Relay station 120 processes the data, signaling, and pilot to generate an uplink relay signal, which is transmitted to base station 110. At base station 110, the uplink relay signal from relay station 120 is received by antenna 1614, conditioned by a receiver 1616, and processed by a receive processor 1618 to recover the data and signaling sent by relay station 120.

Controllers/processors 1620, 1640 and 1660 direct the operation of various units within base station 110, relay station 120, and subscriber station 130, respectively. Controller/processor 1640 may perform or direct process 1200 in FIG. 12 and/or other processes for the techniques described herein. Controller/processor 1660 may perform or direct process 1400 in FIG. 14 and/or other processes for the techniques described herein. Memories 1622, 1642 and 1662 store data and program codes for base station 110, relay station 120, and subscriber station 130, respectively.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 1622, 1642 or 1662 in FIG. 16) and executed by a processor (e.g., processor 1620, 1640 or 1660). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to receive data and a first pilot from a first station, and to resend the data and to send a second pilot to a second station; and
a memory coupled to the at least one processor,
wherein the at least one processor is configured to receive channel information from the second station, the channel information being derived by the second station based on the second pilot, and to select a rate for data transmission to the second station based on the channel information.

2. A method for wireless communication, comprising:
receiving data and a first pilot from a first station;
receiving from the first station information indicative of a pilot format for a second pilot; and
resending the data and sending a second pilot to a second station, wherein the second pilot is sent in accordance with the pilot format for the second pilot, and wherein the pilot format for the second pilot replicates the way the first station would send the second pilot when the first station was transmitting the second pilot to the second station, wherein the pilot format for the first pilot comprises a first pattern of pilot subcarriers across a plurality of subcarriers and the pilot format for the second pilot comprises a second pattern of pilot subcarriers across the plurality of subcarriers, the second pattern being different from the first pattern.

3. The method of claim 2, wherein each of the first and second pilots is sent on at least one pilot subcarrier in at least one OFDM symbol, with location of the at least one pilot subcarrier being determined by a pilot format.

4. The method of claim 2, further comprising:
receiving the first pilot in accordance with a first pilot format; and
sending the second pilot in accordance with a second pilot format different from the first pilot format.

5. The method of claim 2, further comprising:
receiving the first pilot in accordance with a pilot format; and
sending the second pilot in accordance with the pilot format used for the first pilot.

6. The method of claim 2, further comprising:
resending the data in accordance with a transmission mode selected from among multiple transmission modes, each transmission mode being associated with a different pilot format; and
sending the second pilot in accordance with a pilot format associated with the selected transmission mode.

7. The method of claim 6, wherein the multiple transmission modes comprise full usage of subcarriers (FUSC), partial usage of subcarriers (PUSC), and band adaptive modulation and coding (AMC).

8. The method of claim 2, further comprising:
deriving a channel estimate based on the first pilot; and
performing detection for the data received from the first station based on the channel estimate.

9. The method of claim 2, further comprising:
forwarding the channel information to the first station.

10. The method of claim 2, further comprising:
receiving channel information from the second station, the channel information being derived by the second station based on the second pilot; and
selecting a rate for data transmission to the second station based on the channel information.

11. The method of claim 2, wherein the first station is a base station and the second station is a subscriber station.

12. The method of claim 11, further comprising:
receiving the data and the first pilot from the base station via a downlink; and
resending the data and sending the second pilot to the subscriber station via the downlink.

13. The method of claim 2, wherein the first station is a base station and the second station is a relay station.

14. The method of claim 2, wherein the first station is a relay station and the second station is a subscriber station.

15. The method of claim 2, wherein the first station is a subscriber station and the second station is a base station.

16. The method of claim 2, wherein the first station is a subscriber station and the second station is a relay station.

17. The method of claim 16, further comprising:
receiving the data and the first pilot from the subscriber station via an uplink; and
resending the data and sending the second pilot to the base station via the uplink.

18. An apparatus for wireless communication, comprising:
means for receiving data and a first pilot from a first station;
means for receiving from the first station information indicative of a pilot format for a second pilot; and
means for resending the data and sending a second pilot to a second station, wherein the second pilot is sent in accordance with the pilot format for the second pilot, and wherein the pilot format for the second pilot replicates the way the first station would send the second pilot when the first station was transmitting the second pilot to the second station, wherein the pilot format for the first pilot comprises a first pattern of pilot subcarriers across a plurality of subcarriers and the pilot format for the second pilot comprises a second pattern of pilot subcarriers across the plurality of subcarriers, the second pattern being different from the first pattern.

19. A method for wireless communication, comprising:
receiving data and a first pilot from a first station;
resending the data and sending a second pilot to a second station;
receiving channel information from the second station, the channel information being derived by the second station based on the second pilot; and
selecting a rate for data transmission to the second station based on the channel information.

20. The method of claim 19, wherein each of the first and second pilots is sent on at least one pilot subcarrier in at least one OFDM symbol, with location of the at least one pilot subcarrier being determined by a pilot format.

21. The method of claim 19, further comprising:
receiving the first pilot in accordance with a first pilot format; and
sending the second pilot in accordance with a second pilot format different from the first pilot format.

22. The method of claim 19, further comprising:
receiving the first pilot in accordance with a pilot format; and
sending the second pilot in accordance with the pilot format used for the first pilot.

23. The method of claim 19, further comprising:
receiving from the first station information indicative of a pilot format for the second pilot; and
sending the second pilot in accordance with the pilot format.

24. The method of claim 19, further comprising:
resending the data in accordance with a transmission mode selected from among multiple transmission modes, each transmission mode being associated with a different pilot format; and
sending the second pilot in accordance with a pilot format associated with the selected transmission mode.

25. The method of claim 24, wherein the multiple transmission modes comprise full usage of subcarriers (FUSC), partial usage of subcarriers (PUSC), and band adaptive modulation and coding (AMC).

26. The method of claim 19, further comprising:
deriving a channel estimate based on the first pilot; and
performing detection for the data received from the first station based on the channel estimate.

27. The method of claim 19, further comprising:
forwarding the channel information to the first station.

28. The method of claim 19, wherein the first station is a base station and the second station is a subscriber station.

29. The method of claim 28, further comprising:
receiving the data and the first pilot from the base station via a downlink; and
resending the data and sending the second pilot to the subscriber station via the downlink.

30. The method of claim 19, wherein the first station is a base station and the second station is a relay station.

31. The method of claim 19, wherein the first station is a relay station and the second station is a subscriber station.

32. The method of claim 19, wherein the first station is a subscriber station and the second station is a base station.

33. The method of claim 19, wherein the first station is a subscriber station and the second station is a relay station.

34. The method of claim 33, further comprising:
receiving the data and the first pilot from the subscriber station via an uplink; and
resending the data and sending the second pilot to the base station via the uplink.

35. An apparatus for wireless communication, comprising:
means for receiving data and a first pilot from a first station;
means for resending the data and sending a second pilot to a second station;
means for receiving channel information from the second station, the channel information being derived by the second station based on the second pilot; and
means for selecting a rate for data transmission to the second station based on the channel information.

36. The apparatus of claim 35, wherein each of the first and second pilots is sent on at least one pilot subcarrier in at least one OFDM symbol, with location of the at least one pilot subcarrier being determined by a pilot format.

37. The apparatus of claim 35, further comprising:
means for receiving the first pilot in accordance with a first pilot format; and
means for sending the second pilot in accordance with a second pilot format different from the first pilot format.

38. The apparatus of claim 35, further comprising:
means for receiving the first pilot in accordance with a pilot format; and
means for sending the second pilot in accordance with the pilot format used for the first pilot.

39. The apparatus of claim 35, further comprising:
means for receiving from the first station information indicative of a pilot format for the second pilot; and
means for sending the second pilot in accordance with the pilot format.

40. The apparatus of claim 35, further comprising:
means for resending the data in accordance with a transmission mode selected from among multiple transmission modes, each transmission mode being associated with a different pilot format; and means for sending the second pilot in accordance with a pilot format associated with the selected transmission mode.

41. The apparatus of claim 40, wherein the multiple transmission modes comprise full usage of subcarriers (FUSC), partial usage of subcarriers (PUSC), and band adaptive modulation and coding (AMC).

42. A computer program product for wireless communication, the computer program product comprising a non-transitory computer readable medium storing instructions exectuable by a processor to:
  receive data and a first pilot from a first station;
  resend the data and sending a second pilot to a second station;
  receive channel information from the second station, the channel information being derived by the second station based on the second pilot; and
  select a rate for data transmission to the second station based on the channel information.

43. An apparatus for wireless communication, comprising:
  at least one processor configured to:
    receive data and a first pilot from a first station;
    receive from the first station information indicative of a pilot format for a second pilot; and
    resend the data and sending a second pilot to a second station, wherein the second pilot is sent in accordance with the pilot format for the second pilot, and wherein the pilot format for the second pilot replicates the way the first station would send the second pilot when the first station was transmitting the second pilot to the second station, wherein the pilot format for the first pilot comprises a first pattern of pilot subcarriers across a plurality of subcarriers and the pilot format for the second pilot comprises a second pattern of pilot subcarriers across the plurality of subcarriers, the second pattern being different from the first pattern; and
  a memory coupled to the at least one processor.

44. A computer program product for wireless communication, the computer program product comprising a non-transitory computer readable medium storing instructions exectuable by a processor to:
  receive data and a first pilot from a first station;
  receive from the first station information indicative of a pilot format for a second pilot; and
  resend the data and sending a second pilot to a second station, wherein the second pilot is sent in accordance with the pilot format for the second pilot, and wherein the pilot format for the second pilot replicates the way the first station would send the second pilot when the first station was transmitting the second pilot to the second station, wherein the pilot format for the first pilot comprises a first pattern of pilot subcarriers across a plurality of subcarriers and the pilot format for the second pilot comprises a second pattern of pilot subcarriers across the plurality of subcarriers, the second pattern being different from the first pattern.

* * * * *